United States Patent [19]

Sakamoto et al.

[11] Patent Number: 4,920,528
[45] Date of Patent: Apr. 24, 1990

[54] METHOD OF DISK RECORDING USING ALTERNATIVE RECORDING TRACKS

[75] Inventors: Noriaki Sakamoto, Soraku; Yoshiki Nishioka, Tenri; Toshihiro Yamanaka, Ikoma; Nobuyuki Horie, Yamatokoriyama; Shozou Kobayashi; Toshihisa Deguchi, both of Nara; Shigemi Maeda, Yamatokoriyama, all of Japan

[73] Assignee: Sharp Kabushiki Kaisha, Osaka, Japan

[21] Appl. No.: 16,258

[22] Filed: Feb. 19, 1987

[30] Foreign Application Priority Data

Feb. 20, 1986 [JP] Japan .................................. 61-36066
Feb. 20, 1986 [JP] Japan .................................. 61-36069

[51] Int. Cl.$^5$ ............................................. G11B 27/36
[52] U.S. Cl. ........................................ 369/54; 369/38; 369/111
[58] Field of Search ..................... 369/54, 58; 360/49; 371/10

[56] References Cited

U.S. PATENT DOCUMENTS

| | | | |
|---|---|---|---|
| 4,405,952 | 9/1983 | Slakmon | 360/49 |
| 4,498,146 | 2/1985 | Martinez | 364/900 |
| 4,558,446 | 12/1985 | Banba et al. | 371/10 |
| 4,611,314 | 9/1986 | Ogata et al. | 369/54 |
| 4,631,723 | 12/1986 | Rathbun et al. | 360/47 X |

FOREIGN PATENT DOCUMENTS

| | | |
|---|---|---|
| 0127311 | 4/1984 | European Pat. Off. . |
| 3403290 | 1/1984 | Fed. Rep. of Germany . |
| 58-3103 | 1/1983 | Japan .................................. 369/54 |

OTHER PUBLICATIONS

IMB Tech. Disc. Bull., vol. 28, No. 7, Dec. 1985, pp. 2803–2805.

Primary Examiner—Aristotelis M. Psitos

[57] ABSTRACT

A disk recording method in which recording is performed on a disklike recording medium having a radially coaxial or spiral recording track that is divided into a predetermined plural number of recording sectors each acting as a recording unit. A predetermined number of dedicated sectors are provided at a rear portion of the recording track so that the contents that are recorded in defective sectors of the recording sectors are alternatively assigned to the dedicated sectors.

3 Claims, 7 Drawing Sheets (N+1)-th track
N-th track
M-th track

METHOD OF DISK RECORDING USING ALTERNATIVE RECORDING TRACKS

BACKGROUND OF THE INVENTION

The embodiments of the present invention generally relate to a recording method in a disk recording apparatus and more particularly, to an alternative recording method when a defective recording sector has been detected.

Conventionally, in a recording apparatus, recording is performed on a disk like recording medium having a radially coaxial or spiral recording track divided into a predetermined plural number of recording sectors each acting as a recording unit. A common practice has been that, when defective recording sectors have been detected during recording, recording data are alternatively assigned to alternative sectors. However, in the known recording apparatus, when the defective recording sectors are larger in number than the alternative sectors, it becomes impossible to use the alternative sectors. Thus, the subsequent processing is required to be performed by a host apparatus. Therefore, the known recording apparatus has a drawback of the host apparatus being required to provide a control device for controlling data of the defective recording sectors so as to skip reading of the defective recording sectors at the time of reproduction.

SUMMARY OF THE INVENTION

Accordingly, an essential object of the present invention is to provide a disk recording method in which the contents of defective recording sectors that are detected during recording are exclusively assigned to alternative sectors provided on a recording medium. Therefore, information indicative of the defective recording sectors, e.g. sector numbers of the defective recording sectors are recorded, in addition to the contents recorded in the defective recording sectors, in the alternative sectors, so that the need for controlling the defective recording sectors is eliminated.

Another important object of the present invention is to provide a disk recording method for when the defective recording sectors are detected to be larger in number than the alternative sectors during recording, the contents of the defective recording sectors are transferred to an alternative track provided exclusively. Therefore, processing of the defective recording sectors and tracks is performed in a disk recording apparatus, the necessity of using a host apparatus in the processing of the defective recording sectors and tracks is obviated.

In order to accomplish these objects of the present invention, a disk recording method according to one preferred embodiment of the present invention is provided. In this embodiment, recording is performed on a disklike recording medium having a radially coaxial or spiral recording track that is divided into a predetermined plural number of recording sectors each acting as a recording unit. The embodiment improvement comprises a predetermined number of dedicated sectors that are provided at a rearward portion of the recording track such that the contents that are recorded in defective sectors of the recording sectors are alternatively assigned to the dedicated sectors.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE EMBODIMENTS OF THE INVENTION

Figure 1:
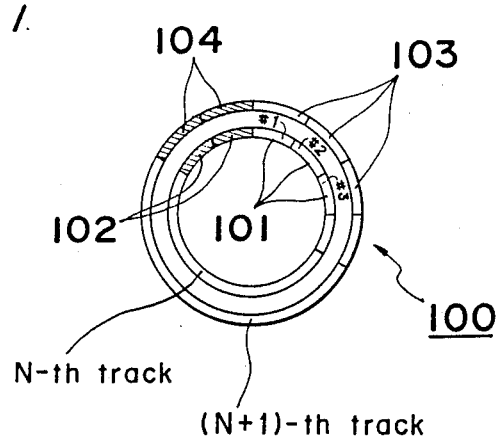
FIG. 1 is a schematic view showing tracks and sectors of a disk employed in a disk recording method according to a first embodiment of the present invention.
Figure 2:
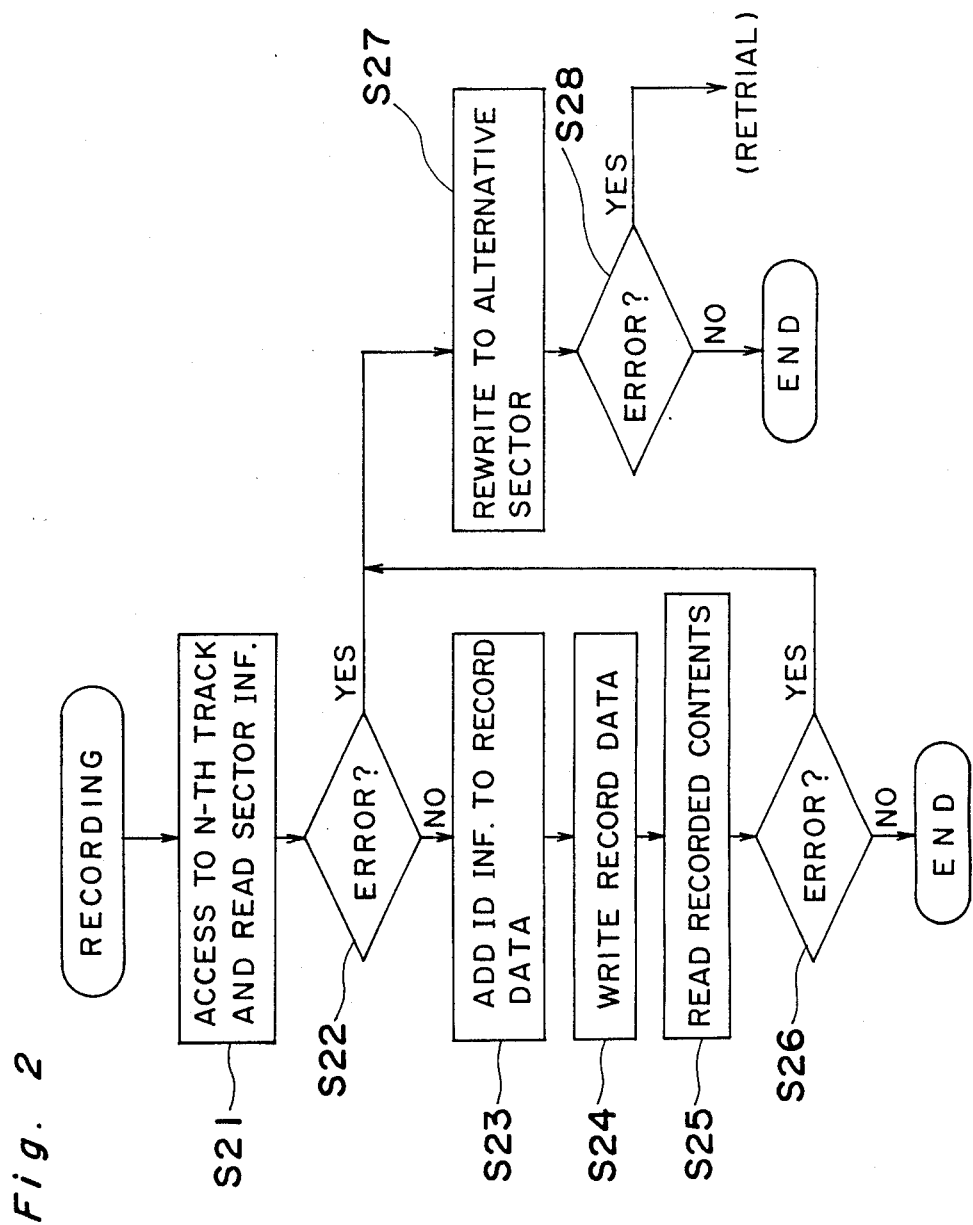
FIG. 2 is a flow chart showing a processing sequence of recording for the disk recording method of FIG. 1.
Figure 3:
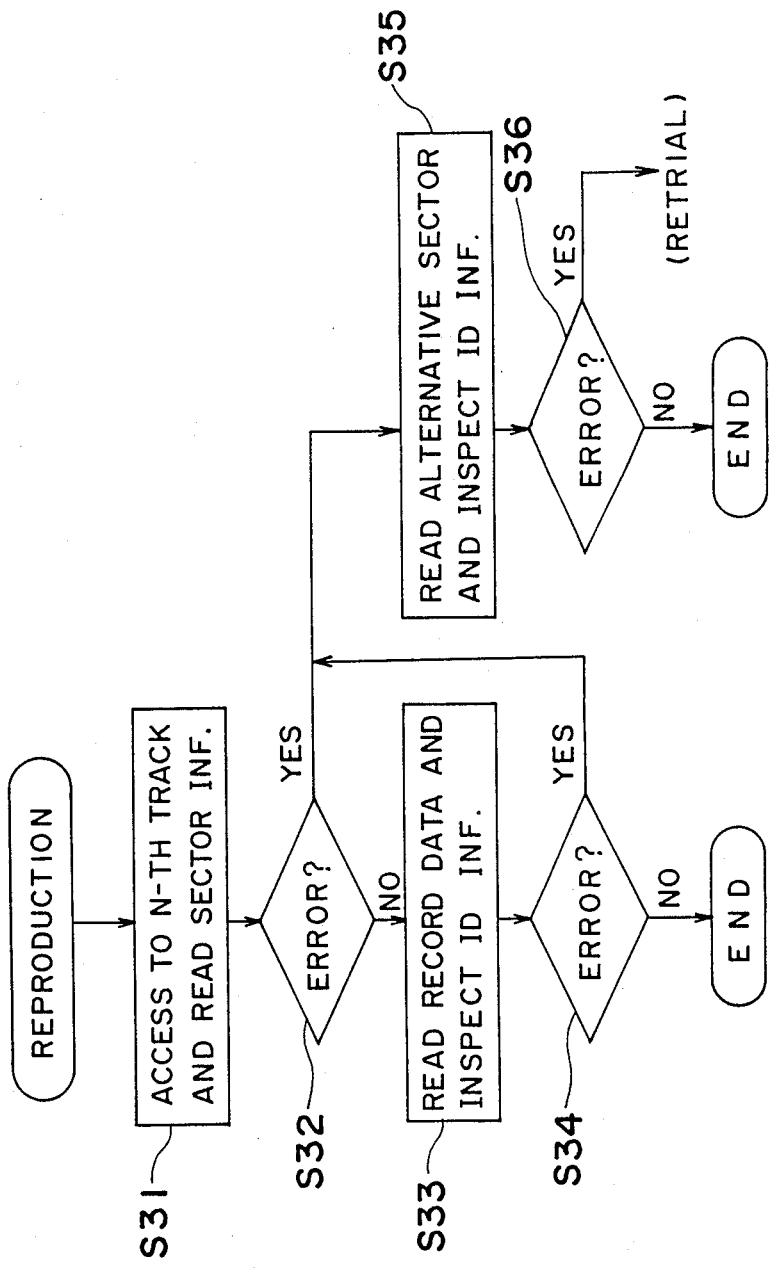
FIG. 3 is a flow chart showing a processing sequence of reproduction in the disk recording method of FIG. 1.

Referring now to the drawings, there is shown in FIG. 1, tracks and sectors of a disk employed in a disk recording method according to a first embodiment of the present invention. FIGS. 2 and 3 are flow charts showing processing sequences of recording and reproduction of the disk recording method of FIG. 1, respectively, while FIG. 4 shows a disk recording apparatus to which the disk recording method of FIG. 1 may be applied.

Figure 4:
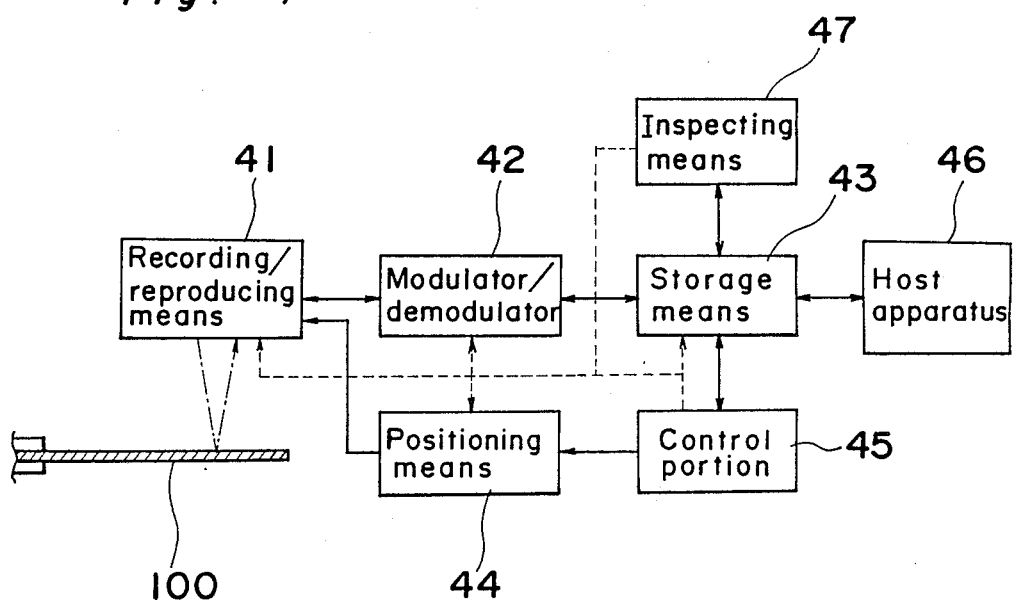
FIG. 4 is a block diagram showing a disk recording apparatus to which the disk recording method of FIG. 1 may be applied.

In FIG. 4, a recording/reproducing means 41 performs recording or reproduction processes on a recording medium 100. A modulator/demodulator 42 performs modulation of data that is reproduced from the recording medium 100 by the recording/reproducing means 41 or performs modulation of data that is to be recorded on the recording/reproducing means 41. A storage means 43 stores data that is reproduced from the modulator/demodulator 42 and data that is to be transferred to the modulator/demodulator 42. The storage means 43 further stores record data that is transferred from a host apparatus 46 and reproduction data that is to be transferred to the host apparatus 46. An inspecting means 47 adds, at the time of recording, ID (identification) information such as a sector number, a track number, etc. to data stored in the storage means 43 and compares, at the time of reproduction, the ID information with target ID information. A positioning means 44 is provided for positioning the recording/reproducing means 41 at a target track on the recording medium 100. A control portion 45 controls the recording/reproducing means 41, the modulator/demodulator 42, the storage means 43, the inspecting means 47 and the positioning means 44 by a program.

In FIG. 1, the recording medium 100 includes an N-th track (N=natural number) and an (N+1)-th track. the N-th track includes recording sectors 101, while the (N+1)-th track includes recording sectors 103. A predetermined number of alternative sectors 102 are provided at a rearward portion of the N-th track for exclusively replacing defective sectors of the recording sectors 101. Likewise, a predetermined number of alternative sectors 104 are provided at a rearward portion of the (N+1)-th track for replacing defective sectors of the recording sectors 103. It is to be noted that although the coaxial recording tracks are provided in the recording medium 100 in FIG. 1, the present embodiment can be similarly applied to an arrangement in which a spiral recording track is provided in the recording medium.

In a disk recording apparatus which applies the disk recording method of the present embodiment, a processing sequence for recording on a recording sector #3 of the recording sectors 101 of the N-th track is described hereinbelow with reference to a flow chart of FIG. 2. At step S21, the recording/reproducing means 41 is positioned above the N-th track by the positioning means 44 to read sector information of the recording sector #3. Then, at step S22, if the sector information of the recording sector #3 due to defects is recognized then the program flow proceeds to step S27 to the steps that are characteristic of the present embodiment. On the other hand, if the target recording sector #3 is accessed by the disk recording apparatus at step S22, then ID information such as a sector number, a track number, etc. is added by the inspecting means 47 to data stored in the storage means 43 at step S23. Subsequently, the data which has the ID information added thereto by the inspecting means 47 is modulated by the modulator/demodulator 42. Then, the data is written, as record data, on the recording sector #3 by the recording/reproducing means 41 at step S24. After completion of recording at step S24, the contents that are recorded in the recording sector #3 are read by the recording/reproducing means 41 at step S25. Then, at step S26, a decision is made by the inspecting means 47 as to whether or not the recording has been properly performed on the recording sector #3. If at step S26, the recording is found to have been properly performed on the recording sector #3, the writing processing on the recording sector #3 is completed. However, if at step S26, the recording is found not to have been properly performed due to defects, then the program flow proceeds to steps S27 and to the steps that are characteristic of the present embodiment.

If an error is detected at steps S22 and S26, then the disk recording apparatus writes, by using the recording/reproducing means 41, on the alternative sector 102 at step S27. At this time, in the same manner as step S23, the ID information such as the sector number, the track number, etc. is added by the inspecting means 47 to the data that is stored in the storge means 43. Then, the data having the ID information added thereto by the inspecting means 47 is written on the recording medium 100. Therefore, if an error is detected at step S28, then a retrial process is performed.

Next, a processing sequence for the reproduction of record information of the recording sector #3 from the N-th track is described hereinbelow with reference to the flow chart of FIG. 3. Initially, at step S31, the recording/reproducing means 41 is positioned above the N-th track by the positioning means 44 and the sector information of the recording sector #3 is read by the recording/reproducing means 41. If at step S32 the sector information is not recognized due to defects, then the program flow proceeds to step S35 for reading the alternative sector 102. On the contrary, if at step S32, the sector information of the recording sector #3 has been properly read by the recording/reproducing means 41 at step S31, then the record data of the recording sector #3 is read by the recording/reproducing means 41 at step S33 so that the record data is demodulated by the modulator/demodulator 42. Furthermore, after demodulation of the record data, at step S33, the inspecting means 47 inspects the ID information such as the sector number, the track number, etc. that is recorded in the record data at step S32 so that a decision is made as to whether or not the ID information is identical with that of the target recording sector. If an error is not detected at step S34 as a result of inspection of the ID information by the inspecting means 47, then the reproducing processing is completed. However, in the case where reproduction of the record data is impossible or in the case that the ID information is not coincident with the target recording sector, an error is detected at step S34 and the program flow proceeds to step S35 so that the reproduced data is not used.

If an error is detected at steps S32 and S34, then the disk recording apparatus reads the contents of the alternative sector 102 at step S35. Furthermore, at step S35, after demodulation of the contents by the modulator/demodulator 42, the inspecting means 47 inspects the ID information such as the sector number, the track number, etc. that is recorded in the record data at step S32 so that a decision is made as to whether or not the ID information is identical with that of the target recording sector. If at step S36 the contents of the alternative sector 102 are identical with those of the target recording sector, then the record data of the alternative sector 102 is processed as the record data of the target recording sector in which an error is detected. However, in the case where reproduction of the record data is impossible or where the contents of the alternative sector are not coincident with those of the target recording sector, an error is detected at step S36 and a retrial process is performed.

By employing the disk recording method of the present embodiment, it becomes possible to perform recording and reproduction efficiently. For example, since the contents of the defective recording sector are recorded in the alternative sector again, the recording/reproducing means is not required to be newly positioned when the defective recording sector has been detected during reproduction.

Furthermore, in accordance with the present embodiment, the sector information of the defective recording sector, in addition to the contents of the defective recording sector, are recorded in the alternative sector. Therefore, when the defective recording sector has been detected during reproduction, it is only necessary to read the alternative sector that is provided at the rearward portion of the track to which the defective recording sector belongs. Thus, it is unnecessary to control which one of the defective recording sectors that is substituted by one of the alternative sectors.

Meanwhile, in accordance with the present embodiment, it is not necessary to control one of the recording sectors that is defective in the disk recording apparatus.

Moreover, in accordance with the present embodiment, the host apparatus is not required at all to be associated with detecting the defective recording sectors and replacing the defective recording sectors by the alternative sectors.

Referring to FIGS. 5 to 8, a disk recording method is shown according to a second embodiment of the present invention.

Figure 8:
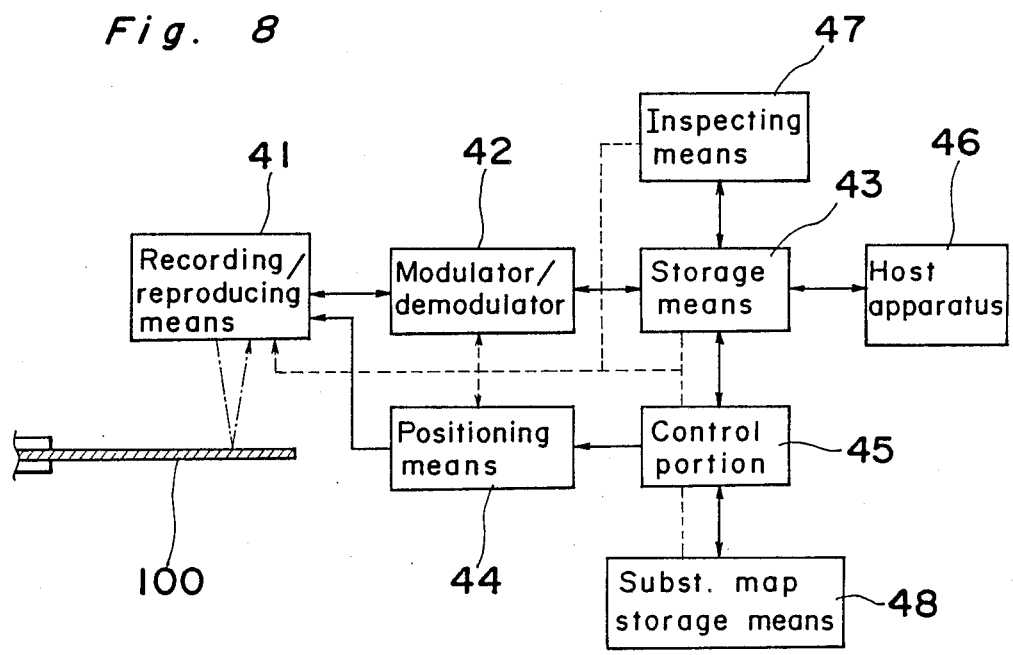
FIG. 8 is a block diagram showing a disk recording apparatus to which the disk recording method of FIG. 5 may be applied.

In FIG. 8, a disk recording apparatus for applying the disk recording method according to the second embodiment of the present invention includes the recording/reproducing means 41, the modulator/demodulator 42, the storage means 43, the positioning means 44, the control portion 45, the host apparatus 46 and the inspecting means 47 in the same manner as the disk recording apparatus of FIG. 4. The disk recording apparatus of FIG. 8 is different from that of FIG. 4 only because the disk recording apparatus of FIG. 8 includes a substitute map storage means 48. The substitute map storage means 48 stores a substitute map that is read from the recording medium 100 when a power source of the disk recording apparatus is turned on or the disk is replaced. The control portion 45 controls the recording/reproducing means 41, the modulator/demodulator 42, the storage means 43, the inspecting means 47, the positioning means 44 and the substitute map storage means 48 by a program.

Figure 5:
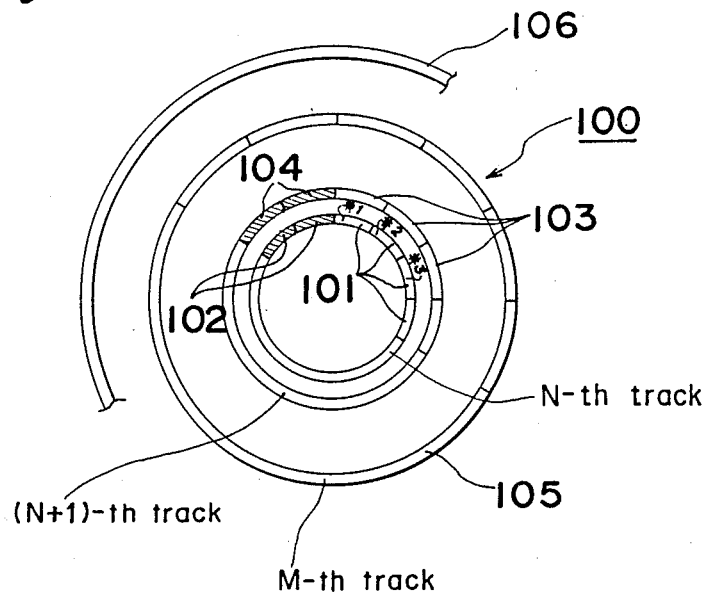
FIG. 5 is a view similar to FIG. 1, which particularly shows a disk recording method according to a second embodiment of the present invention.

Meanwhile, in FIG. 5, a disk that is employed in the disk recording method according to the second embodiment of the present invention includes an M-th alternative track (M =natural number larger than N) surrounding the N-th track and a substitute map recording area 106 surrounding the M-th alternative track 105. The M-th alternative track is exclusively used to replace defective recording sectors. Since other constructions of the disk of FIG. 5 are similar to those of the disk of FIG. 1, a detailed description thereof is abbreviated for the sake of brevity.

Figure 6A:
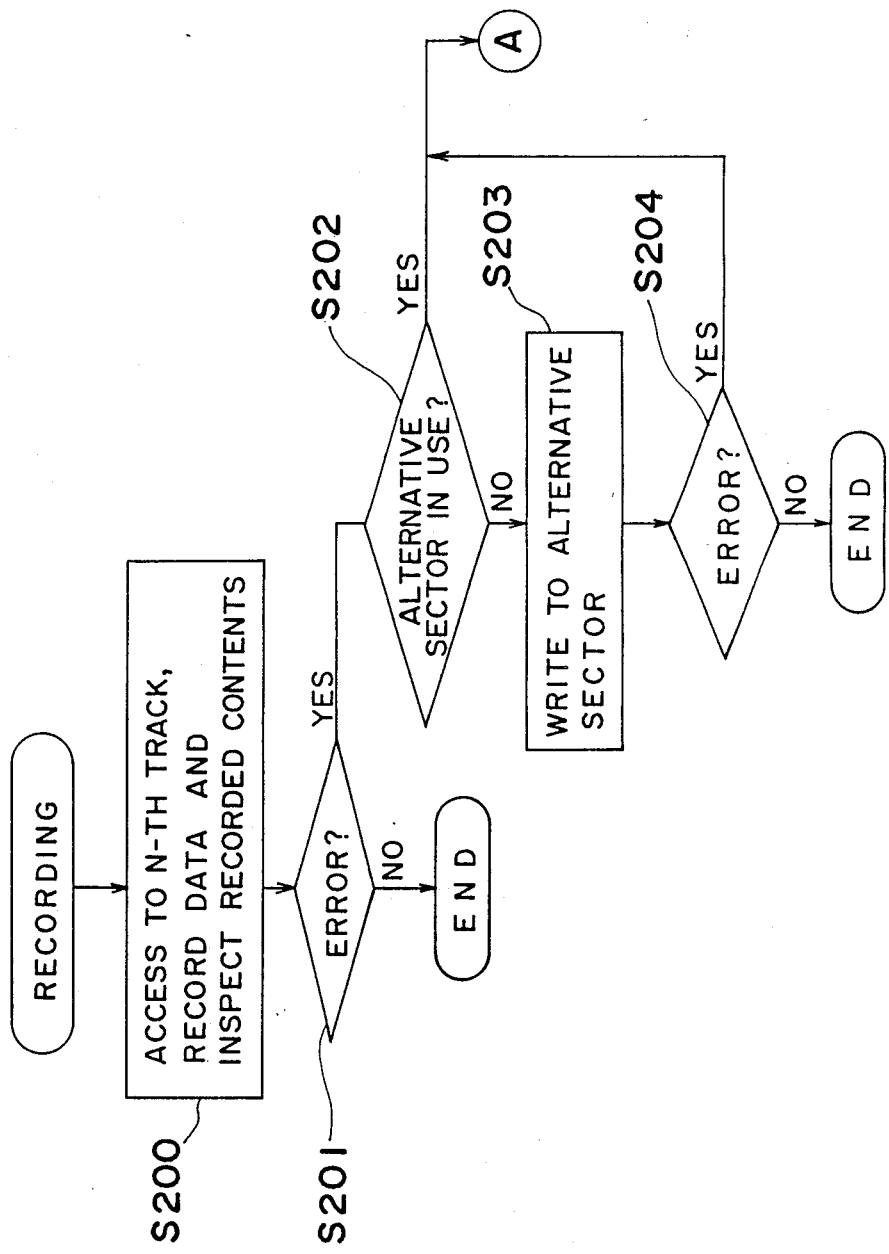
FIGS. 6A and 6B are flow charts showing a processing sequence of recording for the disk recording method of FIG. 5.
Figure 6B:
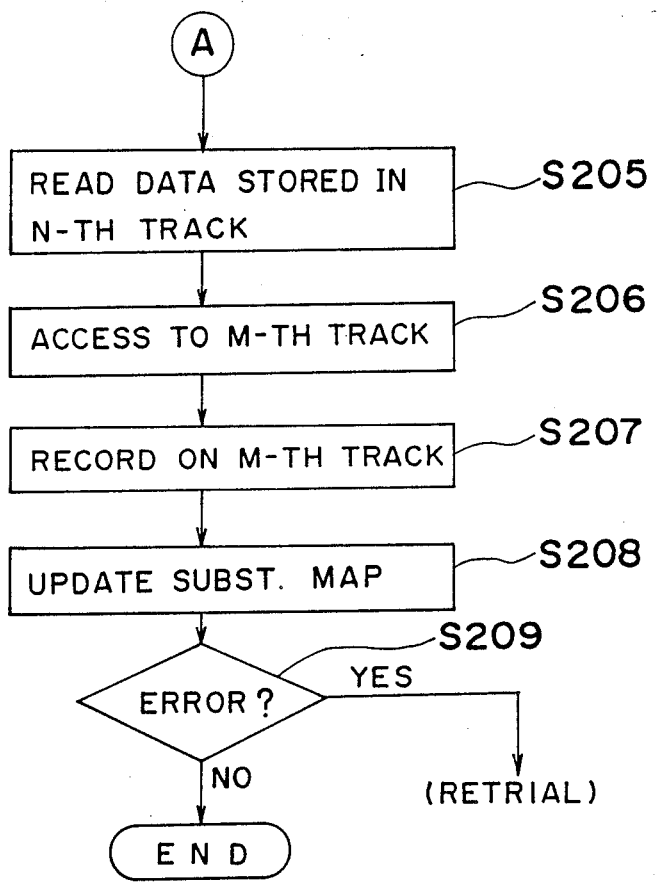

In the disk recording apparatus for applying the disk recording method according to the second embodiment of the present invention, a processing sequence for recording on the recording sector #3 of the recording sectors 101 of the N-th track is described hereinbelow with reference to flow charts of FIGS. 6A and 6B. At step S200, the recording/reproducing means 41 is positioned above the N-th track by the positioning means 44 so that sector information of the recording sector #3 read and record data that is to be recorded on the recording sector #3 is modulated by the modulator/demodulator 42 so that the record data is written on the recording sector #3 by the recording/reproducing means 41. At step S200, after the record is recorded on the recording sector #3, the contents that are recorded on the recording sector #3 are read by the recording/reproducing means 41. Then, the contents are inspected by the inspecting means 47 so that a decision is made by the inspecting means 47 as to whether or not the recording has been performed properly. At step S200, in the case where the sector information of the recording sector #3 cannot be read by the recording/reproducing means 41 due to defects or in the case where the recording has not been properly performed as a result of an inspection of the contents of the recording sector #3 by the inspecting means 47, an error is detected at step S201 and the program flow proceeds to step S202. When an error is not detected at step S201, the recording process is completed.

In the case where an error has been detected at step S201, a decision as to whether or not the alternative sector 102 has been already used alternatively for another recording sector is made at step S202 by using a flag, etc. that is recorded in the alternative sector 102. If at step S202, the alternative sector 102 is not in use, then the data is written on the alternative sector 102 at step S203. If it is found at step S204 that the data is written on the alternative sector 102 properly, then the recording process is completed. When an error is detected at step S204, the program flow proceeds to step S205.

When an error is detected at steps S202 and S204, all data of the N-th track is read by the recording/reproducing means 41 at step S205 and is stored in the storage means 43. Subsequently, the recording/reproducing means 41 is positioned at the M-th alternative track at step S206 and the contents of the N-th track are recorded on the M-th alternative track at step S207. At this time, the data recorded in the alternative sectors 102 are recorded on the M-th alternative track after the data has been returned to the original recording sectors 101. Meanwhile, in order to indicate that a substitution has been performed, the contents of the substitute map are updated at step S208. If an error is detected at step S209, then a retrial process is performed.

Figure 7:
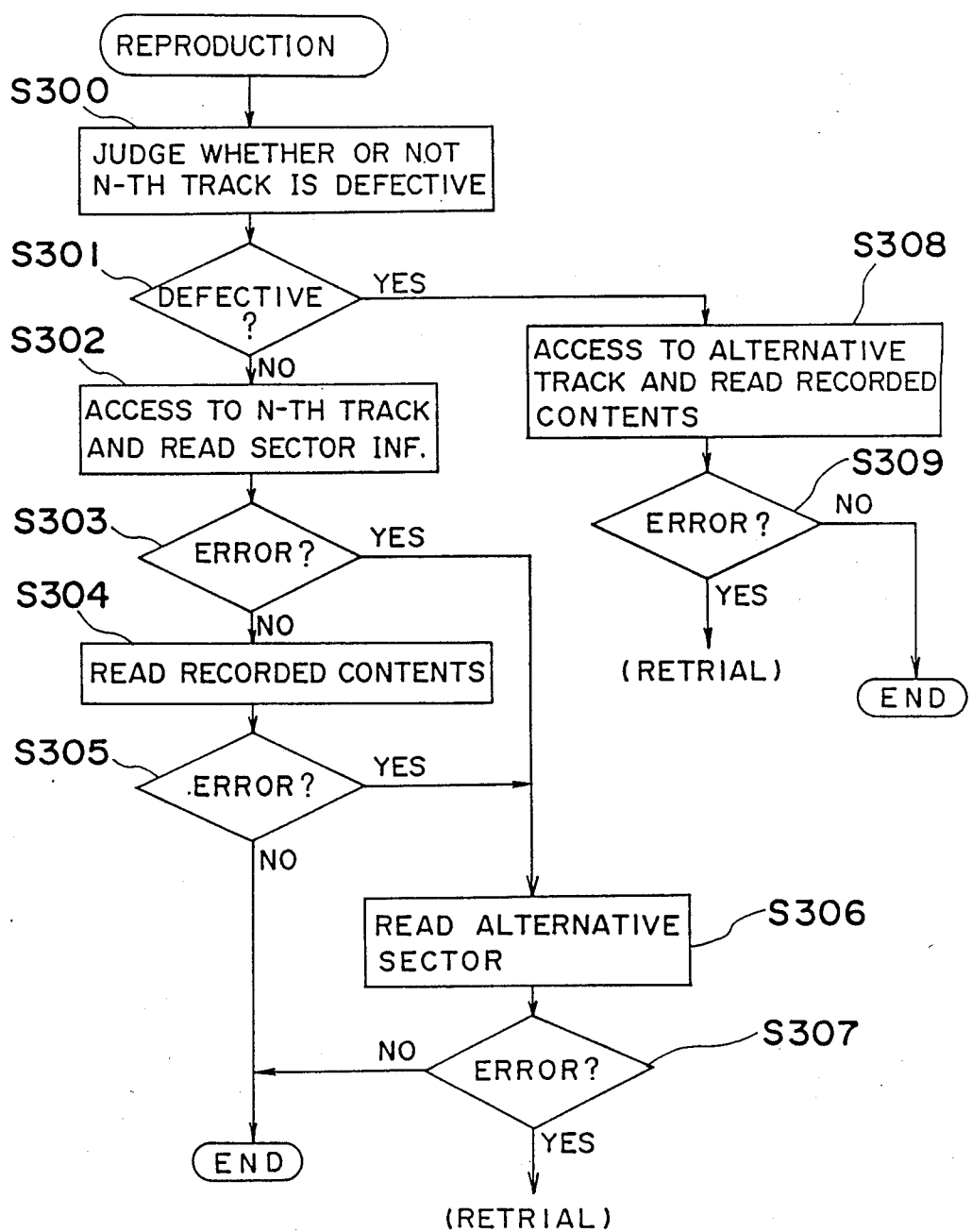
FIG. 7 is a flow chart showing a processing sequence of reproduction for the disk recording method of FIG. 5.

Next, a processing sequence for the reproduction of the contents of the recording sector #3 of the recording sectors 102 for the N-th track is described hereinbelow with reference to a flow chart as shown in of FIG. 7. then the power source of the disk recording apparatus is turned on or the disk is replaced, the disk recording apparatus reads a defective track substitute map provided that is preliminarily provided at a predetermined position of the disk and stores in the substitute map storage means 48, information indicative of the relation between defective tracks and alternative tracks that replace the defective tracks. Thus, it is possible to judge whether or not the track to be read is registered as a defective track. Therefore, when the track to be read is registered as the defective track, the recording/reproducing means 41 is not positioned to the defective track but the recording/reproducing means 41 is directly positioned to the alternative track that replaces the defective track.

In the case where the N-th track to be read is not registered as the defective track at step S301, the disk recording apparatus positions the recording/reproducing means 41 above the N-th track such that the sector information of the recording sector #3 is read by the recording/reproducing means 41 at step S302. Then, if the sector information of the recording sector #3 could not be recognized by the recording/reproducing means 41 due to defects at step S302, an error is detected at step S303 and the program flow proceeds to step S306 so that the alternative sector is read. If the alternative sector can be read at step S306, then a decision is made at step S307 to determine whether or not the information on the defective recording sector, which is contained in the contents of the alternative sector, indicates the defective recording sector as the recording sector #3. If at step S307, the defective recording sector is determined to be the recording sector #3, then the contents of the alternative sector are employed as the record data. On the other hand, at step S306, in the case where the alternative sector cannot be read or the alternative sector has replaced a recording sector than the recording sector #3, an error is detected at step S307 and a retrial process is performed.

In the case where the sector information of the recording sector #3 has been properly read by the recording/reproducing means 41 at step S302, the program flow proceeds to step S304 and the record data of the recording sector #3 is read. Thereafter, a decision is made at step S305 to determine whether or not there is an error in the record data. When there is no error at step S305, the record data is processed so as to be valid. On the contrary, when there is an error at step S305, the program flow proceeds to step S306 and the alternative sector is read.

If at step S301, the N-th track to be read is registered as the defective track then, the recording/reproducing means 41 is not positioned to the defective track but the recording/reproducing means 41 is directly positioned to the alternative track that replaces the defective track so the record data of the alternative track is read at step S308. Then, a decision is made at step S309 to determine whether or not the record data of the alternative track has been properly read. If at step S309, the record data of the alternative track has been properly read, then the record data is processed so as to be valid. On the other hand, if at step S309, the record of the alternative track has not been properly read, then a retrial process is performed.

In accordance with the second embodiment of the present invention, recording and reproduction can be performed efficiently. For example, regarding the track having many defective recording sectors, since the data of the track that has many defective recording sectors is recorded in the substitute map indicative of correspondence between the defective track and the alternative track, the recording/reproducing means can be directly positioned to the alternative track. Therefore, the recording/reproducing means is not required to be positioned to the defective track, and the access time is drastically reduced.

Although the embodiments of the present invention have been fully described by way of examples with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A method for recording data on a disklike recording medium in a read after write system having a plurality of primary recording tracks, and a substitute map recording area with each of the plurality of primary recording tracks having a predetermined number of primary recording sectors and a predetermined number of alternate recording sectors comprising the steps of:

(a) accessing one of said plurality of primary recording tracks;
    (b) accessing one of said predetermined number of primary recording sectors of said one primary recording track;
    (c) determining whether said one primary recording sector contains errors;
    (d) writing data to said one primary recording sector when errors are determined to be absent from said one recording sector;
    (e) accessing one of said predetermined number of alternate recording sectors when errors are determined to exist in said one recording sector;
    (f) determining whether said one alternate recording sector is available for writing data;
    (g) writing data to said one alternate recording sector when said one alternate recording sector is available for writing data;
    (h) determining whether one of said predetermined number of alternate recording sectors is available to be accessed when said one alternate recording sector fails to be available for writing data and accessing said one alternate recording sector that is determined to be available;
    (i) repeating steps (f) - (h) when one of said predetermined number of alternate recording sectors is available to be accessed; and
    (j) writing data to an alternate recording track and writing substitute map information to the substitute map recording area indicative of the location of said one primary recording track and said one primary recording sector when each of said predetermined number of alternate recording sectors fails to be available for access.

2. A method for recording data as claimed in claim 1, further comprising the step of returning to said plurality of primary recording tracks after substitute map information is written to the substitute map recording area.

3. A method for recording data as claimed in claim 1 wherein said recording system includes storage means therein, further comprising the steps of:

reading said substitute map information from the substitute map recording area of the recording medium;
    storing said substitute map information in said storage means when said recording medium is replaced in said recording system with power being supplied to said recording system or said recording system is initially supplied with power and said recording medium is present in said recording system; and
    reading said substitute map information from said storage means to determine the location of said plurality of primary recording tracks and recording sectors that are written in said alternate recording track.

* * * * *